Jan. 14, 1947.　　B. S. FERGUSON　　2,414,146
MATERIAL HANDLING MACHINE
Filed April 2, 1945　　9 Sheets-Sheet 1

INVENTOR.
Berlin S. Ferguson
BY
Evans + McCoy
ATTORNEYS

Jan. 14, 1947.　　　B. S. FERGUSON　　　2,414,146
MATERIAL HANDLING MACHINE
Filed April 2, 1945　　　9 Sheets-Sheet 2

INVENTOR.
Berlin S. Ferguson
BY
Evans + McCoy
ATTORNEYS

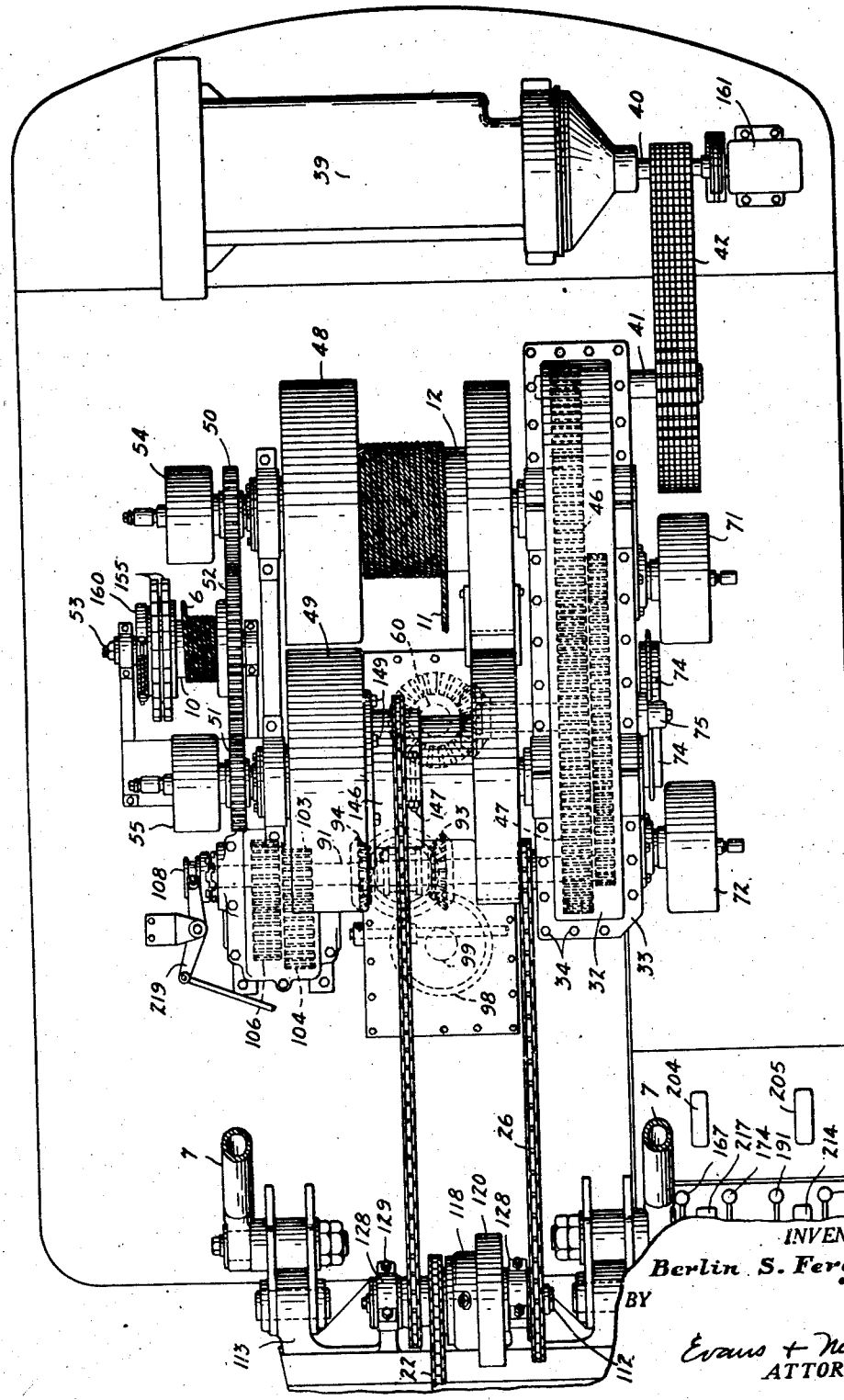

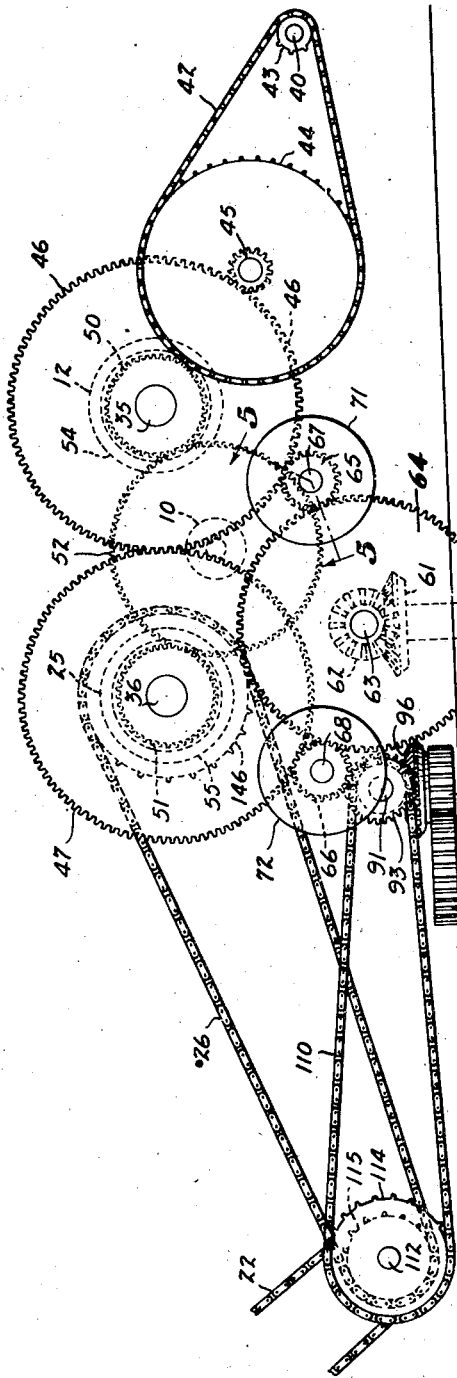
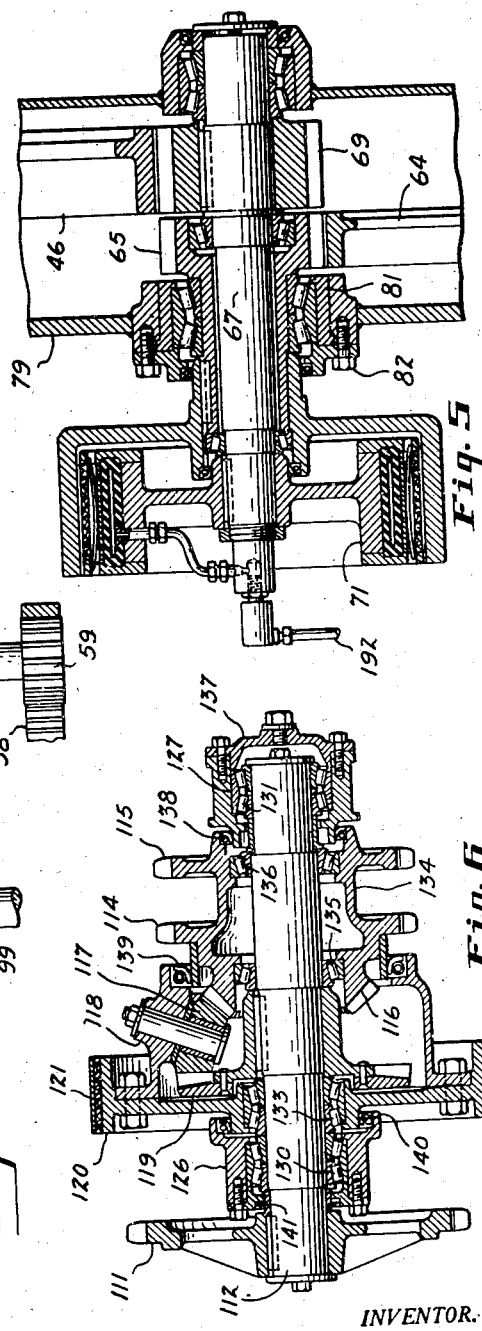
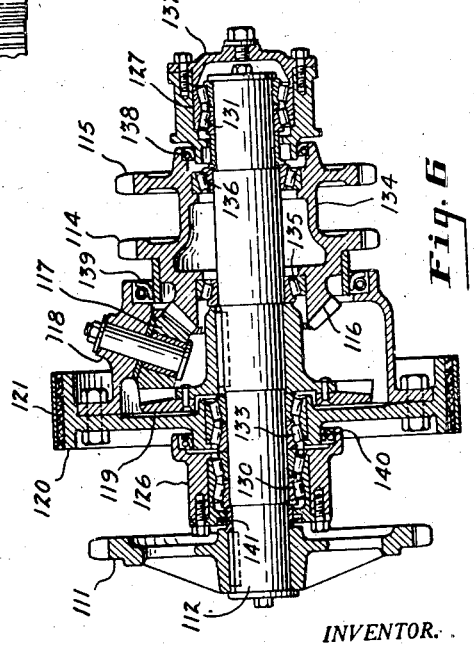

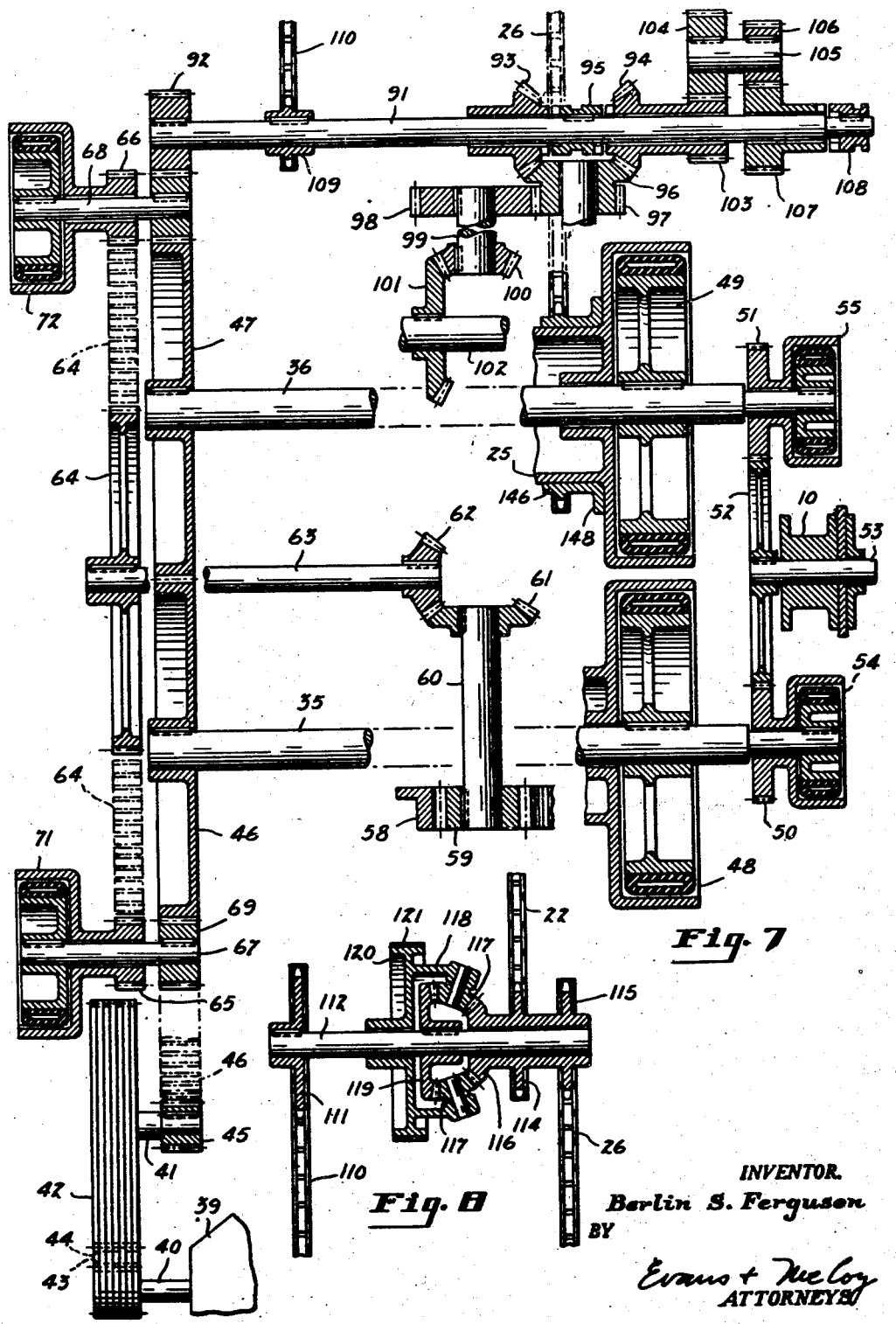

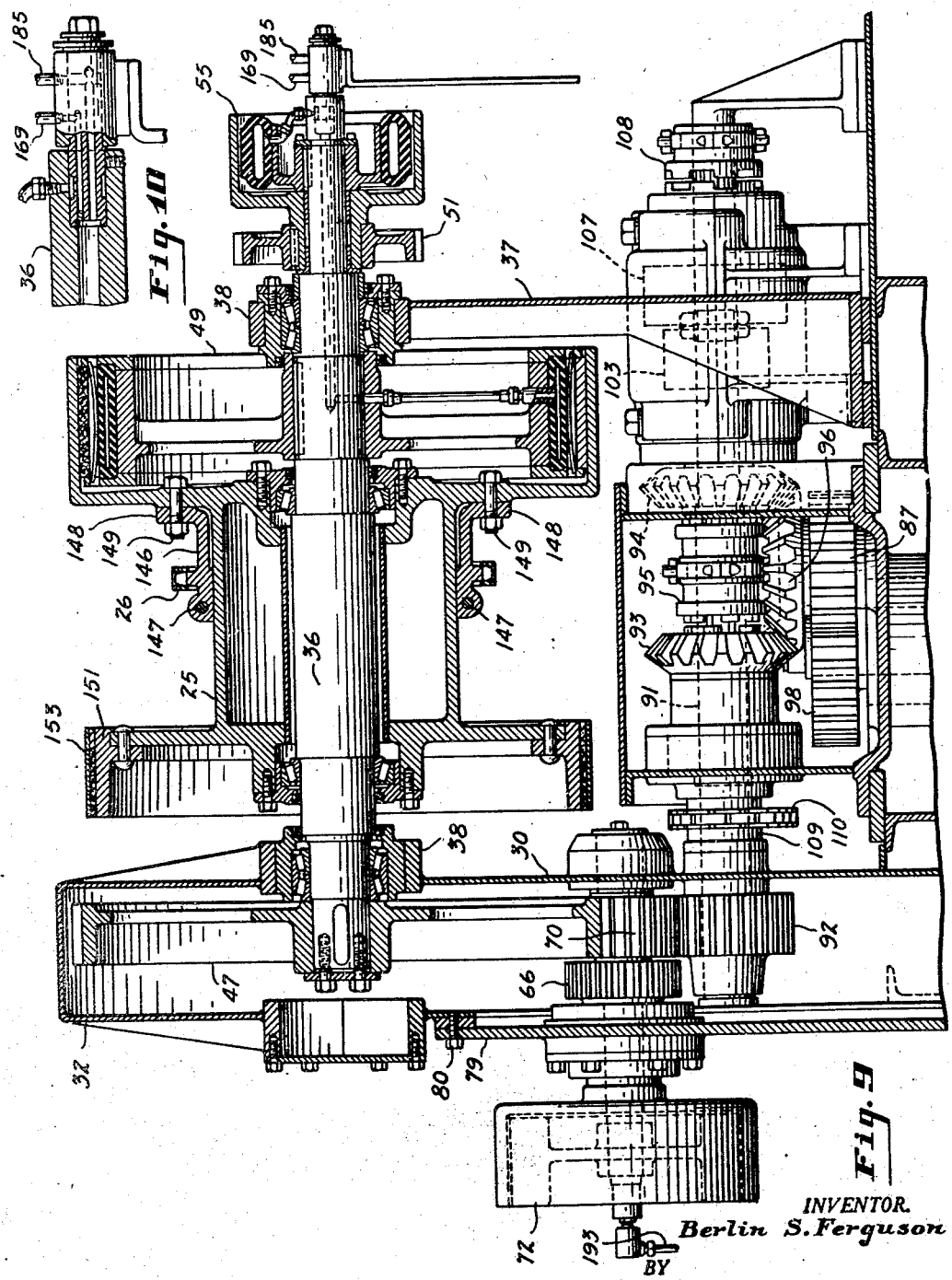

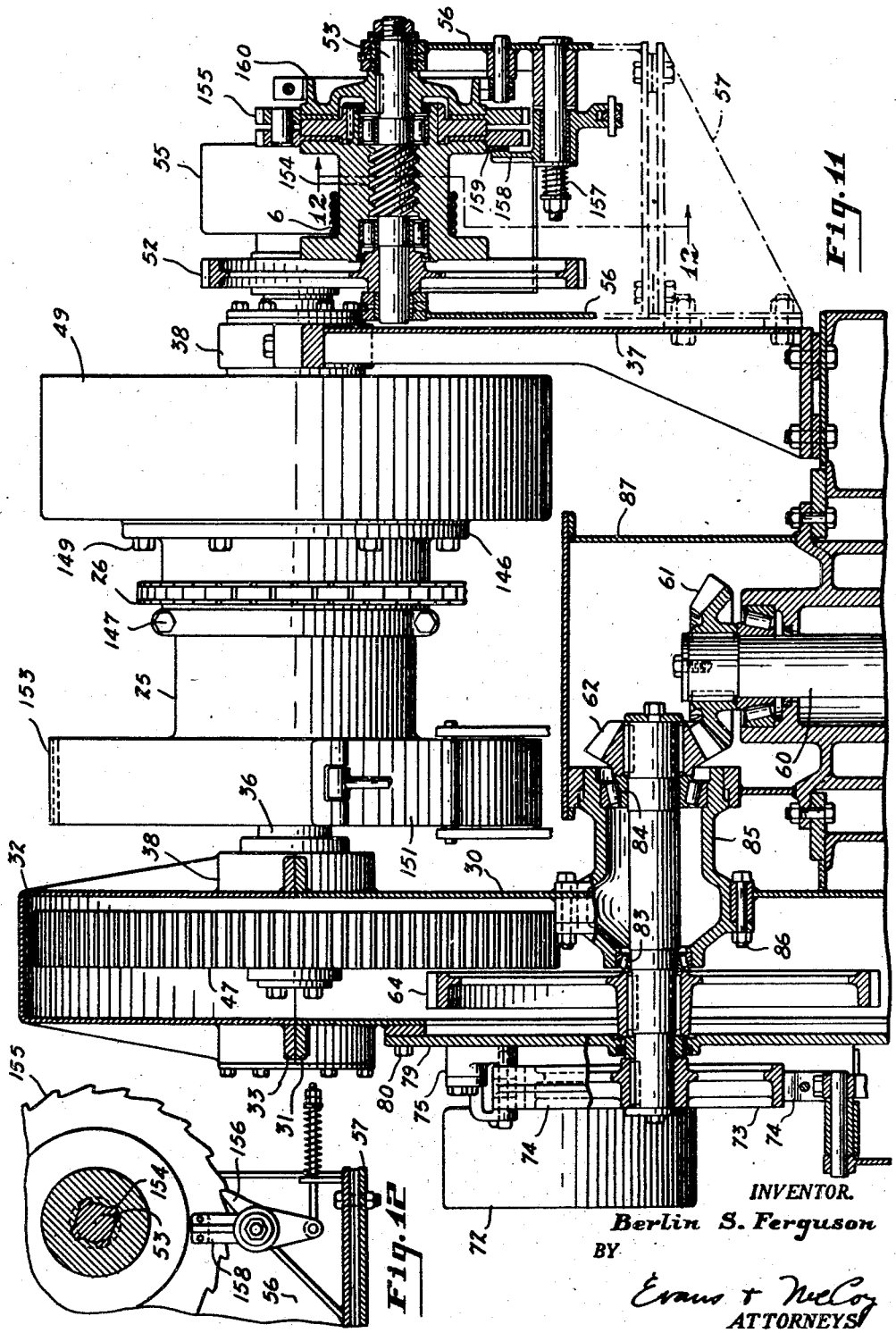

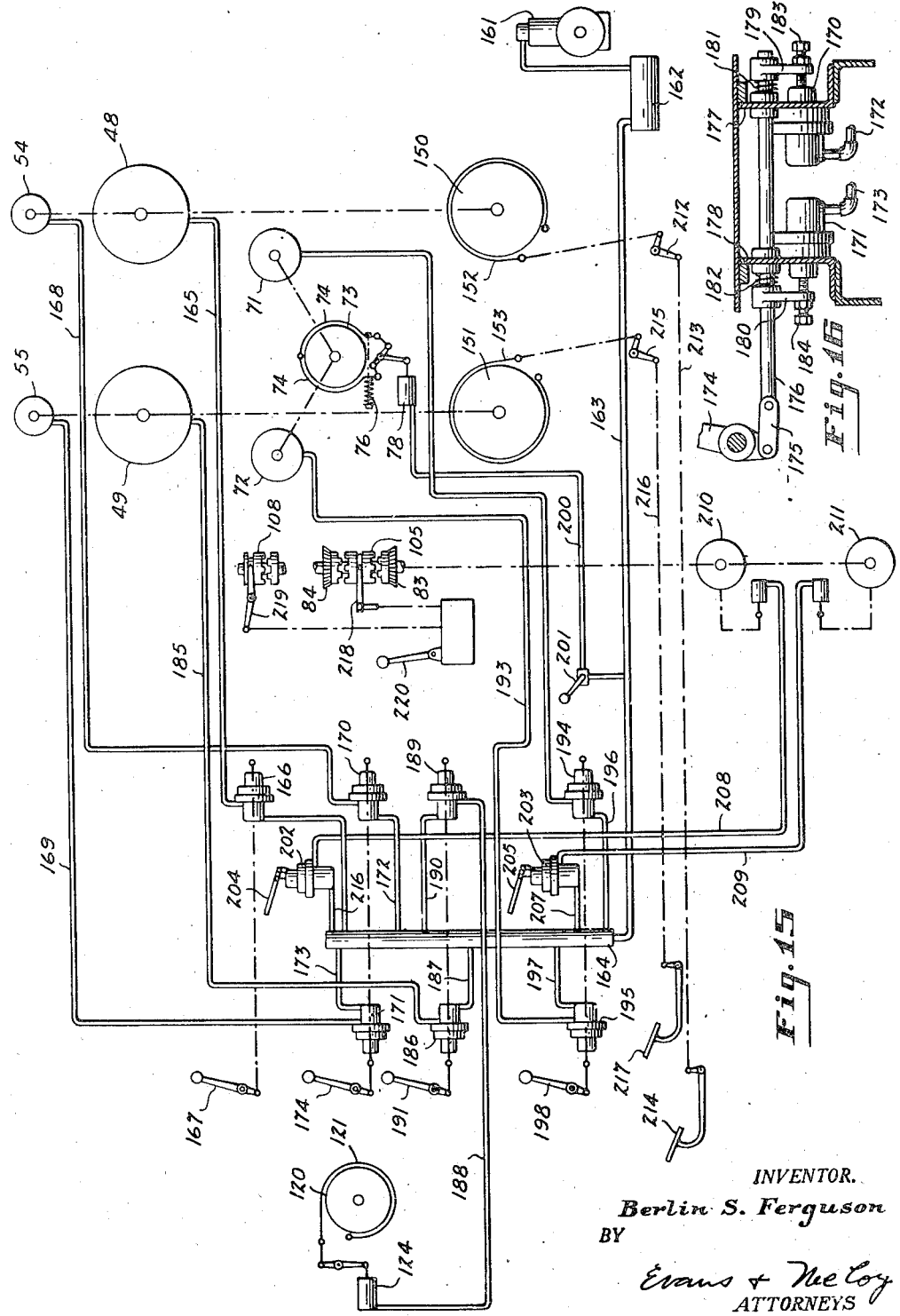

Patented Jan. 14, 1947

2,414,146

UNITED STATES PATENT OFFICE 2,414,146

MATERIAL HANDLING MACHINE

Berlin S. Ferguson, Ravenna, Ohio, assignor to The Byers Machine Company, Ravenna, Ohio, a corporation of Ohio Application April 2, 1945, Serial No. 586,098

22 Claims. (Cl. 214—135)

This invention relates to material handling machines of the type employing hoist drums and particularly to machines of the swinging boom type such as power shovels and cranes, in which the hoisting, swinging and propelling mechanisms are mounted upon a turntable carried by a suitable truck.

The present invention has for its object to provide a hoisting mechanism suitable for use in various material handling and excavating machines of the character referred to that is so mounted and so geared to a source of power that a number of additional independently removable mechanisms may be associated therewith in a compact unit, whereby a single standard operating mechanism may be employed in a number of different machines and whereby machines may be readily converted from one type to another by removal, addition, or interchange of parts without disturbing the main operating mechanism.

A further object of the invention is to provide a truck mounted material handling mechanism in which the main and auxiliary operating mechanisms are so mounted and so geared to the main hoist mechanism that auxiliary mechanism may be removed without affecting the operation of the remaining mechanisms A further object of the invention is to provide hoisting drums so associated with the other mechanisms that the drums may be removed without disturbing the remaining mechanisms and the other mechanisms are readily accessible without removing the drums.

With the above and other objects in view, the invention may be said to comprise the machine as illustrated in the accompanying drawings hereinafter described and particularly set forth in the appended claims, together with such variations and modifications thereof as will be apparent to one skilled in the art to which the invention pertains.

Reference should be had to the accompanying drawings forming a part of this specification, in which:

Fig. 3 is a top plan view of the mechanism on the platform;

Fig. 4 is a side elevation of the gear train with the housing omitted;

Fig. 5 is a section taken on the line indicated at 5—5 in Fig. 4;

Fig. 6 is an axial section through the planetary retract mechanism mounted on the inner end of the boom;

Fig. 7 is a simplified schematic view of the operating mechanism in which the various gears, clutches, sprockets, etc. are shown in axial section;

Fig. 8 is a simplified schematic view of the retract mechanism;

Fig. 9 is a vertical section taken on the line indicated at 9—9 in Fig. 2;

Fig. 10 is a fragmentary sectional view on an enlarged scale showing connections for delivering air under pressure through a drum shaft to clutches thereon;

Fig. 11 is a vertical section taken on the line indicated at 11—11 in Fig. 2;

Fig. 12 is a fragmentary detail view showing the ratchet of the boom hoist mechanism and its pawl;

Fig. 15 is a diagrammatic view of the control system, and

Fig. 16 is a detail view showing one of the pairs of inter-connected pneumatic pressure control valves.

Figure 1:
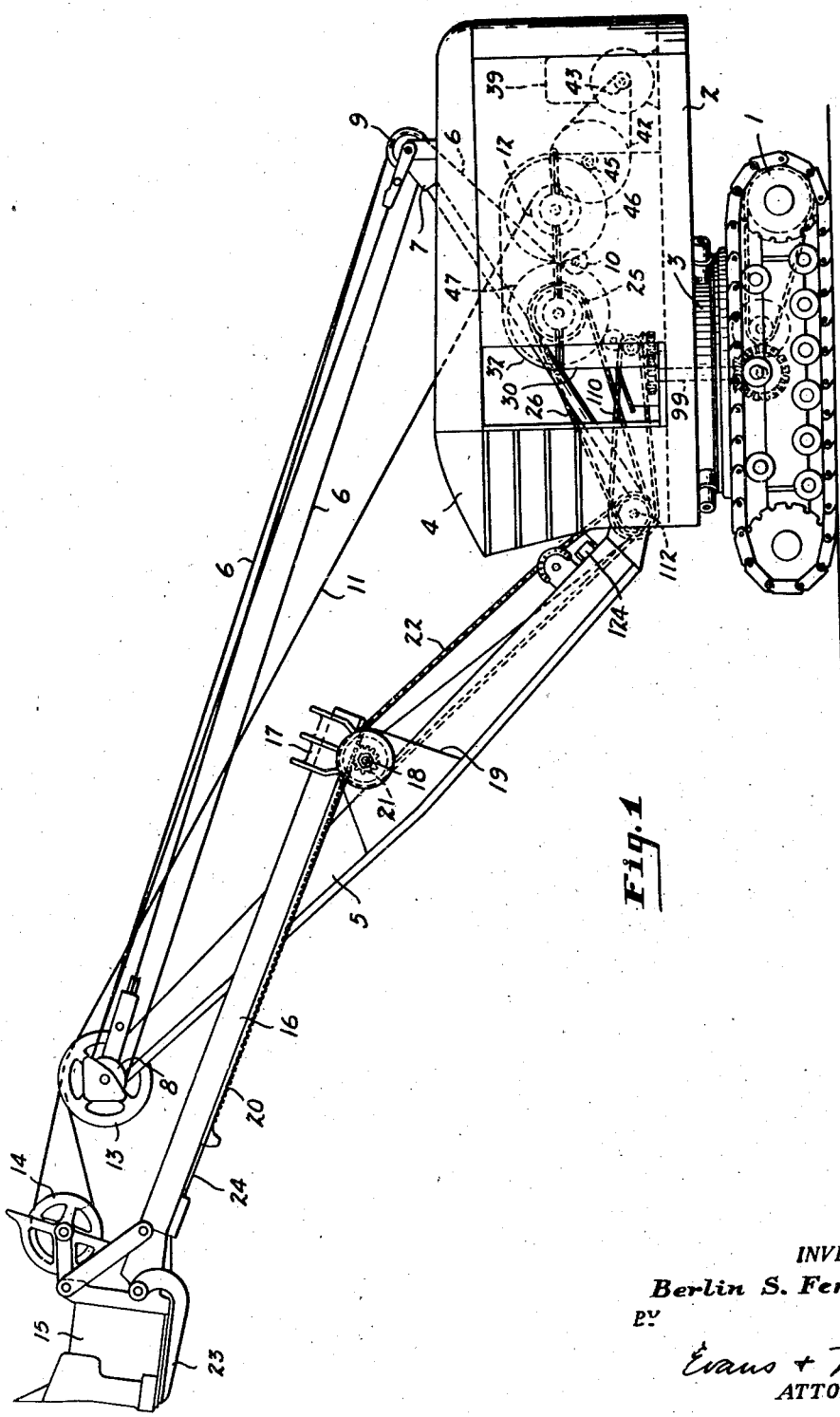
Figure 1 is a side elevation of a dipper type power shovel embodying the invention.
Figure 2:
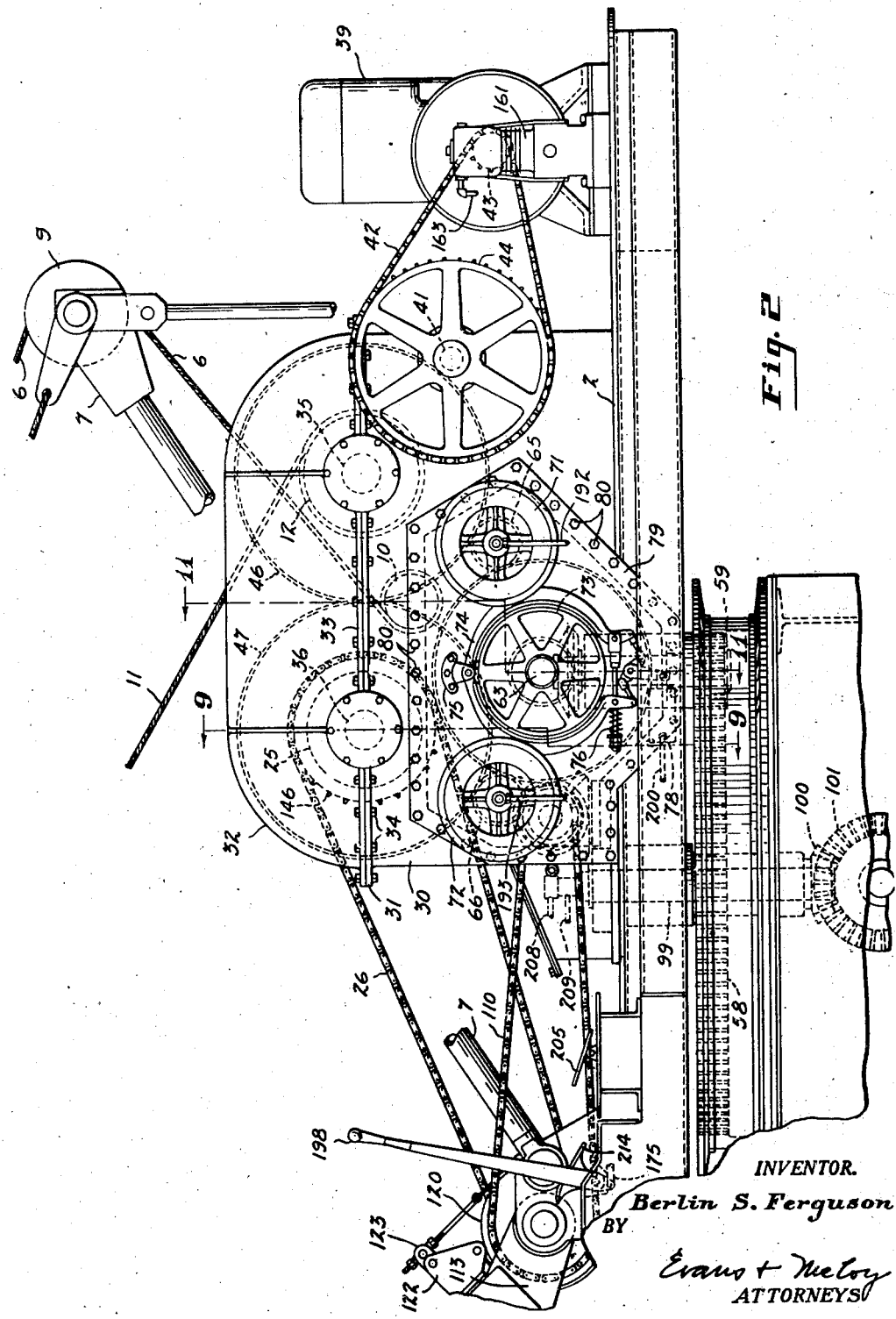
Fig. 2 is a side elevation of the operating mechanism mounted on a turntable platform.

In Fig. 1 of the drawings the mechanism of the present invention is shown applied to a power shovel of the dipper type that is mounted upon a suitable truck 1 which may be of the caterpillar type. A suitable platform 2 is carried by a turntable 3 mounted on the truck 1. The platform 2 provides a support for the operating mechanism and may be provided with a suitable cab 4 for housing the mechanism. A boom 5 is connected by a horizontal pivot to the forward end of the platform 2 and may be raised or lowered by means of a hoist cable 6 that is anchored at one end to a strut 7 carried by the platform 2 and reeved over a block 8 attached to the outer end of the boom and a block 9 attached to the strut 7. The end of the cable 6 opposite that anchored to the strut 7 is wound on a boom hoist drum 10 carried by the platform 2. A cable 11 attached at one end to a hoist drum 12 and at its opposite end to the boom 5 extends over a sheave 13 at the outer end of the boom 5 and has a loop that supports a sheave 14 attached to a dipper 15, so that the sheave 14 and dipper 15 are elevated when the cable 11 is wound up on the drum 12.

The dipper 15 is attached to the outer end of a dipper stick 16 that is slidably mounted in a yoke 17 pivoted to a shaft 18 mounted in a bracket 19 on the boom 5. The dipper stick 16 has racks 20 formed on the under side thereof and pinions 21 on the shaft 18 mesh with the rack 20 to extend or retract the dipper. The shaft 18 is operated to crowd the dipper by means of a sprocket chain 22 driven by a mechanism on the platform, as will be hereinafter explained.

The scoop 15 has a pivoted bottom 23 of the conventional type that may be held closed by a latch which is operated by suitable means such as a cable 24 that extends parallel with the dipper stick 16 through the yoke 17 and which may be wound on a drum 25 carried by the platform 2 which is geared to the sprocket chain 22 by means of a sprocket chain 26.

On the platform 2 adjacent one side thereof there is mounted an elongated hollow wall 30 that extends along one side of the mechanism on the platform and forms a gear housing. The hollow wall 30 has a flange 31 along its top edge to receive a detachable cover 32 that has a flange 33 that fits upon the flange 31, the cover being secured to the flange 31 by means of bolts 34. Horizontal drum shafts 35 and 36 are mounted in the wall 30 and in a wall 37 that extends along the opposite side of the platform 2, the opposite end portions of the shafts 35 and 36 being mounted in suitable bearings 38 that are detachably mounted in the top portion of the wall 30 and at the top of the wall 37. The bearings 38 are removably mounted in the walls 30 and 37 and the shafts 35 and 36 can be removed with the bearings 38.

An engine 39 is mounted on the rear end of the platform 2 with its shaft 40 parallel to shafts 35 and 36. A short countershaft 41 mounted in the rear end of the hollow wall 30 is driven from the shaft 40 by a sprocket chain 42 which passes over a small sprocket 43 on the shaft 40 and a large sprocket 44 on the shaft 41. The shaft 41 has a small gear 45 within the hollow wall 30 that meshes with a large gear 46 that is fixed to the drum shaft 35 within the hollow wall. A gear 46 on the shaft 35 meshes with a gear 47 of the same size fixed to the drum shaft 36. The drums 12 and 25 are rotatably mounted on the shafts 35 and 36 and provided with clutches 48 and 49, preferably of the pneumatic type, for connecting them to the shafts 35 and 36. All of the independently operable power operated parts of the machine are driven through the drum shafts 35 and 36 or through the gear train which includes the gears 46 and 47 fixed to the drum shafts, and all of the auxiliary operating mechanisms are so associated with the primary hoist mechanism that any or all may be removed without affecting the operativeness of the primary hoist mechanism which comprises the winding drums 12 and 25 together with the drum shafts and the gear train through which the shafts are driven.

The shafts 35 and 36 project beyond the wall 37 a short distance and have gears 50 and 51 rotatably mounted thereon outside the wall 37. The two gears 50 and 51 mesh with a large gear 52 on a shaft 53 that carries the boom hoist drum 10. The gears 50 and 51 are provided with clutches 54 and 55, which are preferably pneumatically operated, for connecting them to the shafts 35 and 36. While the engine is being operated the drum shafts 35 and 36 are continuously driven in opposite directions so that when the gear 50 is clutched to the shaft 35 the boom hoist drum shaft 53 will be driven in one direction and when the gear 51 is clutched to the shaft 36 by means of the clutch 55, the boom hoist drum shaft 53 will be driven in the opposite direction.

The boom hoist mechanism is mounted on a housing 56 that is detachably supported upon a bracket 57 secured to the wall 37 on the outer side thereof, the housing 56 and mechanism therein being removable as a unit when desired. Since the boom hoist mechanism is operated by gears 50 and 51 which may be released from shafts 35 and 36 and which engage only the gear 52, the removal of the boom hoist unit will not affect the operation of the other mechanism on the platform.

The turntable 3 carries a gear 58 that is engaged by a pinion 59 mounted on a vertical shaft 60 carried by the platform 2, the shaft 60 having a bevel gear 61 at its upper end that meshes with a bevel gear 62 attached to a horizontal shaft 63 above the platform that extends through the housing 30. The shaft 63 has a large gear 64 attached thereto within the hollow wall 30 and this gear meshes with small gears 65 and 66 rotatably mounted in short countershafts 67 and 68 journaled in the hollow wall 30. The countershafts 67 and 68 have pinions 69 and 70 attached thereto inwardly of pinions 65 and 66 that mesh with the gears 46 and 47. The gears 65 and 66 have hubs on the outer sides thereof that are provided with clutches 71 and 72 outside the gear housing that are preferably of the pneumatic type, by which either gear may be clutched to its shaft. Since the gears 46 and 47 are constantly driven in opposite directions, the gear 64 may be driven in one direction by clutching the gear 65 to the countershaft 67 and in the opposite direction by clutching the gear 66 to the countershaft 68. By operating one or the other of the clutches 54 or 55, the platform 2 may be swung either in a clockwise or in a counter-clockwise direction.

The shaft 63 projects through the outer side of the hollow wall 30 and has a drum 73 fixed to its projecting end. The drum 73 is engaged by shoes 74 pivoted to an anchor bracket 75 and normally held in drum engaging position by a spring 76. The brake shoes 74 may be released to permit the turntable to swing by means of a fluid pressure cylinder 78.

Shaft 63 geared to the turntable together with the gearing by which the shaft 63 is driven provides a reversible swing mechanism and this mechanism like the boom hoist mechanism is a unit that may be removed without affecting the operation of the primary hoist mechanism. The shaft 63 and the countershafts 67 and 68 are carried by a plate 79 that forms a removable panel in the outer side of the hollow wall 30, the plate 79 being detachably secured in place by bolts 80. By removing the plate 79 the swing mechanism is removable as a unit with the plate 79.

As best shown in Fig. 5 of the drawings, the countershaft 67 is supported by a bearing 81 that is carried by the hub of the gear 65 and detachably secured to the plate 79 by bolts 82. The bearing 81 is of a diameter greater than either of the gears 65 or 69 on the countershaft 67, so that when the bolts 82 are removed the countershaft 67 with its attached clutch and gears may be removed from the housing independently of the main swing shaft 63 and its attached gears.

The countershaft 68 with its gears and clutch forms an identical detachable unit.

As best shown in Fig. 11 of the drawings, the inner end of the shaft 63 is journaled in spaced roller bearings 83 and 84 that are carried by a tubular shell 85. The inner bearing 84 is interposed between the shell 85 and the hub of the beveled gear 62 which is fastened to the inner end of shaft 63 and the outer bearing 83 abuts against the hub of the gear 64 so that the shell 85 is retained on the shaft 63 between the gear 62 and the gear 64. The shell 85 has portions formed to fit in the circular opening in the inner wall of the gear housing 30 and in a wall of a housing 87 which encloses the bevel gears 61 and 62. The portion of the shell 85 that fits in the opening of the housing 87 is of greater diameter than the gear 62 and of less diameter than the portion of the shell that fits in the opening of the housing 30, so that the shaft 63 with the gear 64, the shell 85 and the gear 62 are removable outwardly as a unit when the bolts 86 that secure the shell 85 to the housing 30 are removed.

A transverse shaft 91 is journaled in the hollow wall 30 near the forward end thereof and adjacent the platform 2 and provides a drive for the truck propelling mechanism and for mechanism that retracts the dipper stick. The shaft 91 has a gear 92 within the hollow wall 30 that meshes with the gear 70 on the shaft 68 so that the shaft 91 is continuously driven through the gears 45, 46, 47 and 70 while the engine is running. Two oppositely facing bevel gears 93 and 94 are rotatably mounted on the shaft 91 and a sliding clutch member 95 imposed between the two gears 93 and 94 is adapted to clutch either of the gears to the shaft 91. The gears 93 and 94 both mesh with a bevel gear 96 that has a spur gear 97 integral therewith. The gear 97 meshes with a gear 98 on a vertical shaft 99 that extends downwardly through the platform 2 and carries a bevel gear 100 at its lower end that meshes with a bevel gear 101 on a transverse driving shaft 102 which has suitable driving connections to the endless treads.

The shaft 102 is driven in one direction by the gear 93 and in the opposite direction by the gear 94. The bevel gear 94 has a spur gear 103 integral therewith that meshes with a larger spur gear 104 on a countershaft 105 and the shaft 105 has a second gear 106 of smaller diameter than the gear 104 that meshes with a gear 107 larger than the gear 103 that is rotatably mounted upon the shaft 91. A shiftable clutch member 108 is slidably keyed to the shaft 91 and is engageable with the gear 107 to clutch the same to the shaft 91.

With the clutch 108 disengaged, the truck may be driven forwardly by engaging the clutch 95 with the gear 94 or rearwardly by engaging the clutch 95 with the gear 93. With the clutch 95 in neutral position, the truck may be driven forwardly at a higher speed, the drive being through gears 107, 106, 104, 103 to the gear 94.

Figure 13:
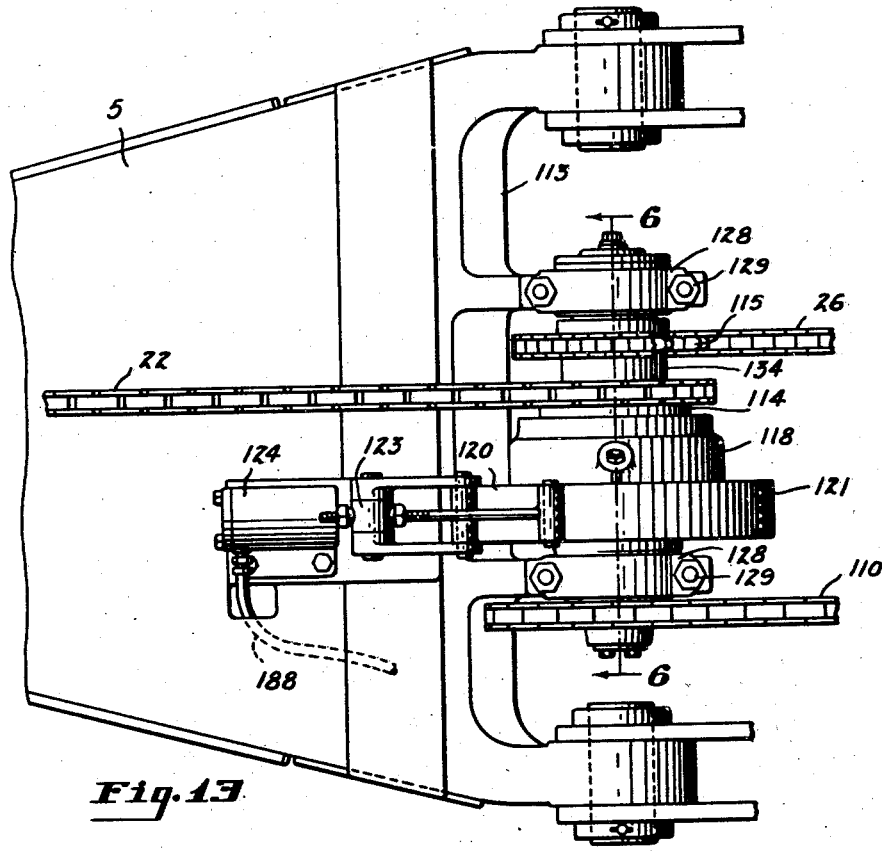
Fig. 13 is a plan view of the retract mechanism.
Figure 14:
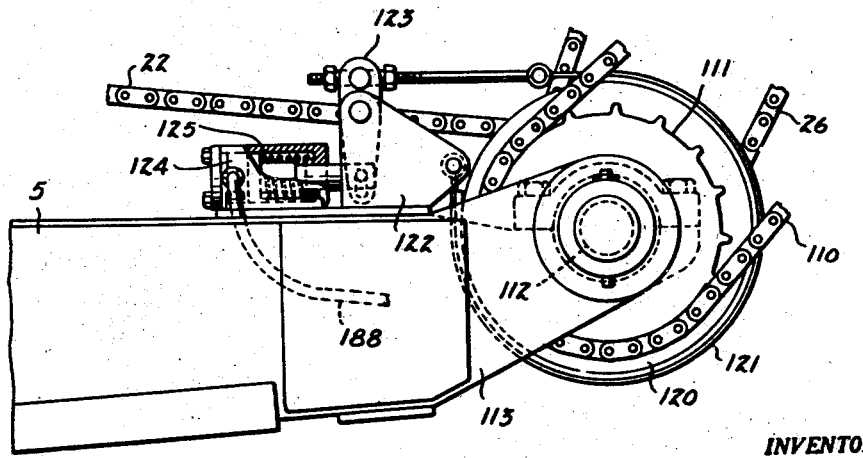
Fig. 14 is a side elevation of the retract mechanism.

The shaft 91 has a sprocket 109 attached thereto which drives a sprocket chain 110 that extends forwardly from the shaft 91 to a sprocket 111 on a shaft 112 that, as best shown in Figs. 13 and 14, is journaled in a bracket 113 attached to the inner end of the boom 5, the axis of the shaft 112 being preferably in substantial alinement with the boom pivot.

The shaft 112 has two integrally connected sprockets 114 and 115 rotatably mounted thereon, the sprocket 114 receiving the sprocket chain 22 and the sprocket 115 receiving the sprocket chain 26 so that the dipper stick actuating pinion 21 may be driven by the sprocket chain 26. As shown in Fig. 6, a bevel gear 116 is formed integrally with the sprockets 114 and 115 and meshes with bevel gears 117 carried by a cage 118 that is also rotatably mounted upon the shaft 112. Within the cage 118 there is a bevel gear 119 of larger diameter than the gear 116 that is fixed to the shaft 112 and that also meshes with the cage gears 117. The cage 118 carries a brake drum 120 and a brake band 121 is provided for engaging the drum 120 to lock the cage against rotation. One end of the band 121 is anchored to a bracket 122 attached to the boom 5 outwardly of the drum 120 and the opposite end of the band 121 is attached to a lever 123 that is operated by a cylinder 124 to apply the band to the drum 120. The band 121 is normally held out of engagement with the drum 120 by a spring 125 which may be mounted within the cylinder 124 to act in opposition with the air pressure so that when the pressure is relieved the band 121 is held in released position.

The shaft 112 is continuously driven through the sprocket 111 and sprocket chain 110. The rotation of the shaft 112 does not affect the operation of the sprockets 114 and 115 unless the cage 118 is locked against movement, since when the cage is free to rotate it does not interfere with relative rotative movements of the shaft 112 and the sprockets 114 and 115. The chain 26 is driven from the drum 25 whenever that drum is clutched to the shaft 36 and the pinion 21 is driven through the sprocket chains 26 and 22 in a direction to extend the dipper stick 16. When the drum 25 is released from the shaft 36 the cage 118 may be locked by the brake band 121 so that the sprockets 114 and 115 will be driven in a direction opposite that in which they are driven from the drum 25. Since the gear 119 is of larger diameter than the gear 116, the reverse rotation of the sprockets 114 and 115 is faster than the forward or crowding movement.

By applying the brake 121 the dipper is retracted and the drum 25 is driven in a direction opposite that in which it is normally driven by the shaft 36. Since the drum 25 is geared to the pinion 21 it may be employed to wind and unwind the latch cable 24, paying out the cable as the dipper stick 16 is extended and winding up the cable as the dipper stick 16 is retracted, so that slack will not form in the line due to crowding and retracting movements of the scoop.

The retract mechanism is mounted as a unit upon the inner end of the boom so that it may be removed with the boom and so that it may be removed from the boom when desired without disturbing the other mechanisms. The retract mechanism is preferably so constructed that all of its bearings may be packed with a lubricant supplied to the interior thereof through a suitable opening in the cage 118.

As best shown in Fig. 6, a sleeve 126 is mounted on the shaft 112 inwardly of the sprocket 111 and a similar sleeve 127 is mounted on the opposite end of the shaft 112, the sleeves 126 and 127 being clamped to the bracket 113 by suitable caps 128 held in place by bolts 129 as shown in Fig. 14. Roller bearings 130 and 131 for the shaft 112 are mounted within the sleeves 126 and 127 and roller bearings 133 are provided for the cage 118. The sprockets 114 and 115 and gear 116 are formed integrally with a tubular shell 134 which forms a lubricant chamber around the shaft 112, roller bearings 135 and 136 being interposed between opposite ends of the shell 134 and the shaft 112. A closure plate 137 is detachably secured to the outer end of the sleeve 127 and covers the adjacent end of the shaft 112. A sealing ring 138 is interposed between the sleeve 127 and the tubular shell 134, a sealing ring 139 is interposed between the tubular shell 134 and the cage 118, a sealing ring 140 is interposed between the cage 118 and the sleeve 126, and a sealing ring 141 is interposed between the sleeve 126 and shaft 112. The sleeves 126 and 127, together with the cage 118 and shell 134 form a continuous lubricant retaining chamber surrounding the shaft 112 and the sealing rings interposed between these relatively rotatable members serve to prevent leakage of lubricant.

As shown in Figs. 9 and 11, a detachable sprocket 146 is mounted on the drum 25 to receive the sprocket chain 26. The sprocket 146 is made in two semi-circular halves that are clamped together on the drum by means of bolts 147. The sprocket 146 also has a side flange 148 that is attached by means of bolts 149 to a side flange of the drum 25.

When an excavator of the dipper type is employed the sprocket 146 on the drum 25 provides a convenient means for driving the dipper stick actuating pinion in a direction to crowd the dipper. However, when the mechanism is employed for operating other types of material handling devices, the sprockets 146 may be quickly and easily removed from the drum 25 so that this drum may be employed for operating a drag line or hoist cable.

The drums 12 and 25 carry brake drums 150 and 151 that may be engaged by brake bands 152 and 153 for locking the drums against rotation when desired.

As best shown in Fig. 11, the boom hoist drum shaft 53 is provided with a threaded portion 154 that engages with the drum 10 which serves to shift the drum bodily toward or away from a ratchet 155. The boom hoist drum operating mechanism is designed to prevent the transmission of the boom load to the driving mechanism during rotation of the drum 10 in a direction to lower the boom, the ratchet 155 being held against rotation in the unwinding direction by a suitable pawl 156 and the thread 154 being such that the drum 10 is crowded toward the ratchet 155 by the pull of the boom hoist cable, this mechanism being substantially the same as that shown in my Patent No. 2,357,462 issued September 5, 1944.

In order to eliminate the noise of the ratchet pounding on the pawl during the hoisting operation, a spring 157 is provided that exerts pressure in an axial direction on the pawl 156, the pawl being slidable on its pivot and having a radially projecting arm 158 that carries a friction shoe 159 that engages with a side face of the ratchet 155. When the drum 10 is rotated in a direction to elevate the boom, the engagement of the friction shoe 159 with the ratchet 155 swings the pawl 156 out of engagement with the ratchet. When the drum is rotated in the opposite direction the friction shoe 159 swings the pawl 156 into ratchet engaging position to lock the ratchet against rotation. The shaft 53 may also be provided with a brake 160.

The engine 39 operates an air compressor 161 that supplies air under pressure to a suitable pressure tank 162 and a pipe 163 delivers air under pressure from the tank 162 to a manifold 164 from which the air is delivered through suitable control valves to the various operating clutches and cylinders. A pipe 165 connects the clutch 46 of the load hoist drum 12 to the manifold 164 through a control valve 166 that is operated by a hand lever 167. In one position of the lever 167 air under pressure is supplied to the pneumatic clutch 46 to clutch the drum 25 to its shaft 36. In the opposite position of the lever 167, the valve 166 is positioned to the exhaust pressure from the clutch 46.

Pipes 168 and 169 extend from the boom hoist control clutches 54 and 55 to valves 170 and 171 that are connected to the manifold 164 by pipes 172 and 173. The two valves 170 and 171 are operated by a hand lever 174 that is so connected to the valves that movement of the lever 174 in one direction from a neutral position operates the clutch 54 and movement of the lever 174 in the opposite direction from its neutral position operates the clutch 55. A suitable operating connection between the lever 174 and the two valves controlled thereby is shown in Fig. 16 of the drawings, in which a link 175 is shown connected to the lever 174 and to a rod 176 that is slidably mounted in brackets 177 and 178. The rod 176 projects through the brackets and has arms 179 and 180 fixed thereto on opposite sides of the brackets. The valves 170 and 171 are mounted in the brackets 177 and 178 and are operated by the arms 179 and 180. Springs 181 and 182 are interposed between the arms 179 and 180 and the brackets 177 and 178 so as to normally hold the rod 176 in a position in which both arms 179 and 180 are spaced from the ends of the valves 170 and 171. The two arms 179 and 180 are provided with adjustable valve actuating screws 183 and 184 which serve to engage and open the valves when the arms are moved toward the valves by the lever 174.

A pipe 185 connects the clutch 49 of the drum 25 to a valve 186 which is connected by a pipe 187 to the manifold 164. A pipe 188 connects the brake operating cylinder 124 that controls the retract mechanism to a valve 189 that is connected by a pipe 190 to the manifold 164. The valves 186 and 189 are interconnected in the same manner as the valves 170 and 171 and are operated by a hand lever 191. By interconnecting the brake operated cylinder 124 and the clutch 49, release of the clutch 49 when the brake 121 is applied is insured and the brake 121 is released when the clutch 49 is applied.

Pipes 192 and 193 connect the swing control clutches 71 and 72 to valves 194 and 195 that are connected by pipes 196 and 197 to the manifold 164. The valves 194 and 195 are interconnected in the same manner as the valves 170 and 171 to insure alternate operation and are actuated by means of a hand lever 198. A pipe 200 connects the brake operated cylinder 78 to the pressure line 163 and is provided with a valve 201 by means of which pressure may be delivered to the cylinder 78 to apply the brake 74 to lock the turntable against rotation.

The steering of the tractor is accomplished as is common practice in the art, by operating clutches, that connect the two endless treads to the propelling shaft. Pneumatically operated steering clutches are preferably employed and these clutches are controlled by valves 202 and 203 that are operated by pedals 204 and 205. The valves 202 and 203 are connected by pipes 206 and 207 to the manifold 164 and by pipes 208 and 209 to tread control clutches 210 and 211, as shown diagrammatically in Fig. 15.

The brakes 152 and 153 that may be set to hold the drums 12 and 25 against rotation are preferably operated by treadles that are mechanically connected to the brake bands. The band 152 which locks the drum 12 is connected through a lever 212 and a cable 213 to a suitable treadle 214, and the band 153 for locking the drum 25 is connected through a lever 215 and a cable 216 to a suitable treadle 217.

The clutch 105 is operated by a suitable shifter lever 218 and the clutch 108 is operated by a shifter lever 219, the operation of the two clutches 105 and 108 being controlled by a shift mechanism 220 of the automobile type so that the clutch 108 will be held out of engagement when the lever 218 is moved to either of its clutching positions and the clutch 105 will be in a neutral position when the clutch 108 is moved to engaging position.

As shown in Fig. 4, the operating mechanism is so mounted on the platform 2 that clearance is provided between the mechanism and opposite sides of the cab and between the mechanism in the forward end of the cab so that the auxiliary actuating units carried by the walls 30 and 31 are conveniently accessible. The control levers 167, 174, 191 and 198 are grouped adjacent the operator's position on the platform, the hand levers and operating pedals being conveniently positioned so that the operator may use both hands and both feet for controlling various operations.

The mechanism of the present invention is so designed that various parts thereof can be removed for repair without interfering with the operation of the machine. For example, if the boom hoist mechanism should get out of repair, the boom 5 could be lashed in a fixed position and the shovel operated with the boom hoist drum and its operating mechanism entirely removed. If the swing mechanism should be damaged this mechanism could be removed with the panel 79, after which the shovel could be operated by manipulating the tractor to swing the shovel until the necessary repairs could be made.

Also, the mechanism of the present invention is adapted to be employed on material handling devices of various kinds, merely omitting certain of the mechanisms where particular operations performed by these mechanisms are not required. For example, in a power shovel with a fixed boom the mechanism could be employed with the boom hoist drum and its operating mechanism omitted. If the lateral swinging of the boom is not required, the swing mechanism can be omitted. When the mechanism is employed to operate mechanisms other than a power shovel of the dipper type, the crowd and retract mechanisms can be omitted.

A single machine may thus, by simple alterations, be adapted to any of a number of different uses and considerable economy is effected in the manufacture of material handling machines by reason of the employment of the same primary operating mechanism for a number of different machines.

It is to be understood that variations and modifications of the specific device herein shown and described for purposes of illustration, may be made without departing from the spirit of the invention.

What I claim is:

1. In a machine of the character described, a truck having a supporting platform, two spaced upright supports on said platform, one of said supports being in the form of a hollow wall and providing a gear housing, two parallel transverse shafts journaled in said supports, a driving shaft extending into the hollow wall at one end, a driven shaft extending into the hollow wall at the opposite end, clutch controlled drums on said transverse shafts between said supports, intermeshing gears fixed to said drum shafts within the hollow wall, a gear fixed to the driving shaft meshing with one of said drum shaft gears, a gear on the driven shaft meshing with the other drum shaft gear, and truck propelling means operated by said driven shaft.

2. In a machine of the character described, a truck having a supporting platform, two spaced upright supports on said platform, one of said supports being in the form of a hollow wall and providing a gear housing, two parallel transverse shafts journaled in said supports, each of said shafts extending into the hollow wall and having gear receiving ends projecting past the supports for the opposite ends of said shafts, a drum rotatably mounted on each of said shafts between said supports, a releasable clutch interposed between each drum and its shaft, intermeshing gears fixed to said shafts within the hollow wall, a drive shaft having a gear within the hollow wall meshing with one of said drum shaft gears, a reversible driving mechanism having a clutch controlled driving connection to each of said intermeshing gears, and a second reversible mechanism having a clutch controlled driving connection to each of said shafts including gears on said projecting ends of said shafts.

3. In a machine of the character described, a turntable, a supporting platform on said turntable, a boom pivoted to the platform, two spaced upright supports on said platform, one of said supports being in the form of a hollow wall and providing a gear housing, two parallel transverse shafts journaled in the upper portions of said supports, winding drums rotatably mounted on said shafts between said supports, a clutch associated with each drum for connecting the same to or disconnecting the same from its shaft, intermeshing gears fixed to said shafts within said hollow wall, a drive shaft geared to one of said drum shafts, a boom hoist mechanism adjacent one of said supports, a swing mechanism for operating the turntable mounted on the other of said supports, and a clutch controlled driving connection from each drum shaft to each of said mechanisms.

4. In a machine of the character described, a turntable, a supporting platform on said turntable, a boom pivoted to the platform, two spaced upright supports on said platform, one of said supports being in the form of a hollow wall and providing a gear housing, two parallel transverse shafts journaled in the upper portions of said supports, winding drums rotatably mounted on said shafts between said supports, a clutch associated with each drum for connecting the same to or disconnecting the same from its shaft, intermeshing gears fixed to said shafts within said hollow wall, a drive shaft geared to one of said drum shafts, a boom hoist mechanism mounted externally of one of said supports, and a clutch controlled driving connection from each of said drum shafts to said mechanism.

5. In a machine of the character described, a turntable, a supporting platform on said turntable, a boom pivoted to the platform, two spaced upright supports on said platform, one of said supports being in the form of a hollow wall and providing a gear housing, two parallel transverse shafts journaled in the upper portions of said supports, winding drums rotatably mounted on said shafts between said supports, a clutch associated with each drum for connecting the same to or disconnecting the same from its shaft, intermeshing gears fixed to said shafts within said hollow wall, a drive shaft geared to one of said drum shafts, a boom hoist mechanism in the form of a unit adjacent one of said supports externally thereof below said drum shafts, a boom hoist drive gear rotatably mounted on each drum shaft, a releasable clutch for connecting each of said drive gears to its shaft, and a gear forming a part of said boom hoist mechanism and meshing with both of said drive gears.

6. In a machine of the character described, a turntable, a supporting platform on said turntable, a boom pivoted to the platform, two spaced upright supports on said platform, one of said supports being in the form of a hollow wall and providing a gear housing, two parallel transverse shafts journaled in the upper portions of said supports, winding drums rotatably mounted on said shafts between said supports, a clutch associated with each drum for connecting the same to or disconnecting the same from its shaft, intermeshing gears fixed to said shafts within said hollow wall, a drive shaft geared to one of said drum shafts, a boom hoist mechanism adjacent one of said supports, a swing mechanism for operating the turntable mounted on the other of said supports, and a clutch controlled driving connection from each drum shaft to each of said mechanisms, each driving connection including intermeshing gears one of which is on one of said drum shafts, each of said mechanisms being removable without disturbing said drum shafts or their driving connections.

7. In a machine of the character described, a truck having a platform, a boom pivoted to the platform, a pair of spaced upright supports on said platform and positioned transversely to the axis of the boom pivot, one of said supports being a hollow wall and forming a gear housing, two transverse shafts journaled in said supports, winding drums rotatably mounted on said shafts between said supports, a clutch for releasably connecting each drum to its shaft, a drive shaft, gearing in said hollow wall forming a driving connection between said drum shafts and between said shafts and said drive shaft, a gear rotatably mounted on each drum shaft, a clutch associated with each of said gears, a boom hoist mechanism having a winding drum and a shaft supporting the same, and a gear on said boom hoist drum shaft meshing with said clutch controlled gears.

8. In a machine of the character described, a truck having a platform, a boom pivoted to the platform, a pair of spaced upright supports on said platform and positioned transversely to the axis of the boom pivot, one of said supports being a hollow wall and forming a gear housing, two transverse shafts journaled in said supports, winding drums rotatably mounted on said shafts between said supports, a clutch for releasably connecting each drum to its shaft, a drive shaft, gearing in said hollow wall forming a driving connection between said drum shafts and between said shafts and said drive shaft, a gear rotatably mounted on each drum shaft, a clutch associated with each of said gears, a boom hoist mechanism mounted exteriorly of one of said walls, said mechanism having a winding drum shaft parallel to and below the first mentioned drum shafts, and a gear on said boom hoist drum shaft meshing with said clutch controlled gears.

9. In a machine of the character described, a turntable, a platform on the turntable, a pair of spaced upright supports on said platform, one of the supports being a hollow wall and forming a gear housing, two transverse shafts journaled in said supports, clutch controlled winding drums carried by said shafts between said supports, intermeshing gears fixed to said shafts within the hollow wall, a driving shaft having a gear meshing with one of said intermeshing gears, a swing mechanism for operating said turntable having a shaft journaled in said hollow wall, a gear fixed to the latter shaft within the hollow wall, two countershafts journaled in said hollow wall and each having a gear fixed thereto and meshing with a drum shaft gear and having a second gear rotatably mounted thereon and meshing with the swing shaft gear, clutches on said countershafts for connecting said rotatably mounted gears thereto, and means for selectively operating said clutches.

10. In a machine of the character described, a turntable, a platform on the turntable, a pair of spaced upright supports on said platform, one of the supports being a hollow wall and forming a gear housing, two transverse shafts journaled in said supports, clutch controlled winding drums carried by said shafts between said supports, intermeshing gears fixed to said shafts within the hollow wall, a driving shaft having a gear meshing with one of said intermeshing gears, a swing mechanism for operating said turntable having a shaft journaled in said hollow wall, a gear fixed to the latter shaft within the hollow wall, two countershafts journaled in said hollow wall and each having a gear fixed thereto and meshing with a drum shaft gear and having a second gear rotatably mounted thereon and meshing with the swing shaft gear, each of said countershafts projecting past the outer housing wall, a clutch on each of said countershafts outside said wall, and means for supporting each of said countershafts on said hollow wall for removal with its gears as a unit from said hollow wall.

11. In a machine of the character described, a turntable, a platform on the turntable, a pair of spaced upright supports on said platform, one of the supports being a hollow wall and forming a gear housing, two transverse shafts journaled in said supports, clutch controlled winding drums carried by said shafts between said supports, intermeshing gears fixed to said shafts within the hollow wall, a driving shaft having a gear meshing with one of said intermeshing gears, a swing mechanism for operating said turntable having a shaft journaled in said hollow wall, a gear fixed to the latter shaft within the hollow wall, two countershafts journaled in said hollow wall and each having a gear fixed thereto and meshing with a drum shaft gear and having a second gear rotatably mounted thereon and meshing with the swing shaft gear, clutches on said countershafts for connecting said rotatably mounted gears thereto, and means for supporting the swing mechanism shaft and said countershafts for removal as a unit from said hollow wall.

12. In a machine of the character described, a turntable, a platform on the turntable, a pair of spaced upright supports on said platform, one of said supports being a hollow wall and forming a gear housing, said hollow wall having a removable panel in its outer wall, two transverse shafts journaled in said supports above said panel, clutch controlled winding drums carried by said shafts between said supports, intermeshing gears fixed to said shafts within the hollow wall, a shaft journaled in said panel parallel with said drum shafts and below the same, gearing interposed between said lower shaft and the turntable, a gear fixed to said lower shaft within the hollow wall, two countershafts journaled in said panel and each having a gear meshing with the gear on said lower shaft and a gear meshing with a gear on a drum shaft, and a clutch controlling one of the gears on each countershaft, said lower shaft and countershafts with the gears thereon being removable with said panel.

13. In a machine of the character described, a turntable, a platform on the turntable, a pair of spaced upright supports on said platform, one of said supports being a hollow wall and forming a gear housing, said hollow wall having a removable panel in its outer wall, two transverse shafts journaled in said supports above said panel, clutch controlled winding drums carried by said shafts between said supports, intermeshing gears fixed to said shafts within the hollow wall, a shaft journaled in said panel and projecting upon opposite sides of said hollow wall, a gear attached to said shaft inwardly of the hollow wall, a driving connection between the latter gear and the turntable, a brake drum attached to said projecting shaft outside the panel, brake shoes carried by the panel and engaging said brake drum, reverse driving connections from said drum shafts to said projecting shaft within the hollow wall, and clutches controlling said driving connections, said clutches and driving connections being mounted on said panel for removal therewith.

14. In a machine of the character described, a truck having a turntable with a platform thereon, a boom carried by the platform, a dipper carried by the boom, a driven shaft on said platform, a winding drum rotatably mounted on said shaft, a clutch on said shaft for releasably connecting the drum to the shaft, a dipper actuating mechanism on the boom including a sprocket, a countershaft adjacent the inner end of said boom, sprockets connected to turn in unison on said countershaft, a sprocket attached to said drum, sprocket chains running from said countershaft sprockets to said drum sprocket and to said actuating mechanism sprocket, a driving connection between said driven shaft and said countershaft, a planetary gearing comprising a gear rotatable with said countershaft sprockets, a gear fixed to the countershaft and a cage rotating on said countershaft and having planet gears running on said shaft and sprocket gears, and a brake for holding said cage against rotation to reverse the direction of movement of said actuating mechanism and said drum.

15. In a machine of the character described, a truck having a turntable with a platform thereon, a boom carried by the platform, a dipper carried by the boom, a driven shaft on said platform, a winding drum rotatably mounted on said shaft, a clutch on said shaft for releasably connecting the drum to the shaft, a dipper actuating mechanism on the boom including a sprocket, a countershaft adjacent the inner end of said boom, sprockets connected to turn in unison on said countershaft, a sprocket attached to said drum, sprocket chains running from said countershaft sprockets to said drum sprocket and to said actuating mechanism sprocket, a driving connection between said driven shaft and said countershaft, a planetary gearing comprising a bevel gear fixed to said countershaft sprockets, a bevel gear fixed to said countershaft and of larger diameter than the gear fixed to the sprockets and a cage rotatable on said countershaft and having a bevel gear meshing with the two first mentioned bevel gears, a brake for holding said cage against rotation, and means for actuating said drum clutch and brake including a control member movable in one direction to apply the clutch and in the opposite direction to apply the brake.

16. In a machine of the character described, a truck having a turntable with a supporting platform thereon, a boom pivoted to the forward end of the platform to swing about a horizontal axis, two spaced upright walls extending lengthwise of the platform, one of said walls being hollow and providing a gear housing, two parallel transverse shafts mounted in the upper portions of said walls, each of said shafts having one end extending into the hollow wall and its opposite end projecting past the other wall, a driving shaft journaled in the hollow wall adjacent the rear end thereof, a driven shaft journaled in the hollow wall adjacent the forward end thereof, gearing in the hollow wall connecting the driving shaft to the driven shaft and to said transverse shafts, a drum rotatable on each of the transverse shafts between said walls, clutches for connecting said drums to said shafts, a swing mechanism positioned below said drums and extending inwardly from said hollow wall, means including gears in said hollow wall for driving said swing mechanism, a boom hoist mechanism detachably mounted on the opposite wall exteriorly thereof and below the drum shafts, a clutch controlled driving connection between the projecting end of each drum shaft and said boom hoist mechanism, and truck propelling mechanism geared to said driven shaft.

17. In a machine of the character described, a truck having a turntable with a supporting platform thereon, a boom pivoted to the forward end of said platform, two spaced upright walls extending lengthwise of said platform, two transverse shafts journaled in said walls, drums rotatably mounted on said shafts between said walls, clutches for connecting said drums to said shafts, a drive shaft adjacent the rear end of one of said walls, a driven shaft mounted adjacent the forward ends of said walls, truck driving means operated by said driven shaft, a gear train forming a driving connection from the driving to the driven shafts and including intermeshing gears fixed to said drum shafts, a reversible boom hoist mechanism detachably mounted on one of said walls below the drum shafts and having a clutch controlled driving connection to each of said drum shafts, a reversible swing mechanism detachably mounted on the other of said walls below the drum shafts and having a clutch controlled driving connection with each of said drum shafts.

18. In a machine of the character described, a turntable, a platform on the turntable, two spaced upright walls on the platform one of said walls being hollow and forming a gear housing, two parallel transverse shafts journaled in said walls, winding drums rotatably mounted on said shafts between said walls, clutches for releasably connecting the drums to said shafts, intermeshing gears on said shafts and positioned within said hollow wall, driving means operatively connected to one of said gears, a swing mechanism for operating the turntable having a shaft parallel to the drum shafts and below the same, said swing mechanism shaft being mounted in said hollow wall, a gear on the swing mechanism shaft within the hollow wall, a countershaft mounted in the hollow wall and having an end projecting from the outer side of said wall, a gear fixed to the countershaft meshing with one of the drum shaft gears, a gear rotatable on the countershaft and meshing with the swing shaft gear, said rotatably mounted gear having a hub projecting through the outer wall of the gear housing, a clutch exteriorly of the housing coacting with said hub to releasably connect the same to the countershaft, a bearing member carried by the hub that is of a diameter larger than the countershaft gears, and means for detachably securing said bearing in the housing wall so that the countershaft with its clutch and attached gears may be removed as a unit from the housing.

19. In a machine of the character described a hollow upright wall forming a gear housing, two transverse shafts journaled in said housing, intermeshing spur gears on said shafts, driving means acting upon one of said gears, a reversible mechanism having a shaft journaled in said housing, a gear fixed to said shaft within the housing, two countershafts journaled in said housing and each having a gear fixed thereto, the latter gears meshing, one with each of said spur gears, a gear rotatable on each of said countershafts and meshing with said gear on the shaft of the reversible mechanism, a clutch on each countershaft outside the housing for connecting the gears rotatable on the countershaft to said countershaft, and means for supporting each countershaft in said housing for removal with its gears as a unit from said housing.

20. In a machine of the character described a hollow upright wall forming a gear housing, two transverse shafts journaled in said housing, intermeshing spur gears on said shafts, driving means acting upon one of said gears, a reversible mechanism having a shaft journaled in said housing, a gear fixed to said shaft within the housing, two countershafts journaled in said housing and each having a gear fixed thereto, the latter gears meshing, one with each of said spur gears, a gear rotatable on each of said countershafts and meshing with said gear on the shaft of the reversible mechanism, a clutch on each countershaft outside the housing for connecting the gears rotatable on the countershaft to said countershaft, means for supporting said reversible mechanism shaft for removal as a unit with its gear from said housing, and means for supporting each countershaft for removal with its gears as a unit from said housing.

21. In a machine of the character described a hollow upright wall forming a gear housing, said housing having a removable panel on the outer side thereof, two transverse shafts journaled in said housing and having intermeshing spur gears thereon within the housing, driving means acting upon one of said gears, a reversible mechanism having a shaft extending through the housing and journaled in said panel, the latter shaft having a gear fixed thereto within the housing, two countershafts extending into said housing and journaled in said panels, said countershafts each having a gear fixed thereto and a gear rotatable thereon, the gears fixed to the countershafts meshing, one with each of said spur gears, and the gears rotatable on the countershafts meshing with the gear on the reversible mechanism shaft, and a clutch on each countershaft outside the housing for connecting the gear rotatable on the countershaft to said countershaft, said reversible mechanism shaft and said countershafts with their gears being removable as a unit with said panel from said housing.

22. In a machine of the character described a hollow upright wall forming a gear housing, said housing having a removable panel on the outer side thereof, two transverse shafts journaled in said housing and having intermeshing spur gears thereon within the housing, driving means acting upon one of said gears, a reversible mechanism having a shaft extending through the housing and journaled in said panel, the latter shaft having a gear fixed thereto within the housing, two countershafts extending into said housing and journaled in said panels, said countershafts each having a gear fixed thereto and a gear rotatable thereon, the gears fixed to the countershafts meshing, one with each of said spur gears, and the gears rotatable on the countershafts meshing with the gear on the reversible mechanism shaft, and a clutch on each countershaft outside the housing for connecting the gear rotatable on the countershaft to said countershaft, said reversible mechanism shaft and said countershafts with their gears being removable as a unit with said panel from said housing, each of said countershafts being mounted for removal as a unit with its gears from said housing independently of said panel.

BERLIN S. FERGUSON.